United States Patent

[11] 3,573,434

[72] Inventors John Gleason Wallace
Shellsville;
Charles Michael Lovendusky, Enola, Pa.
[21] Appl. No. 755,848
[22] Filed Aug. 28, 1968
[45] Patented Apr. 6, 1971
[73] Assignee AMP Incorporated
Harrisburg, Pa.

[54] CARD READER
7 Claims, 6 Drawing Figs.

[52] U.S. Cl. 235/61.11, 200/46
[51] Int. Cl. G06k 7/01
[50] Field of Search 235/61.113, 61.112, 61.76, 101, 61.11; 346/79, 82, 89, 104; 200/46 (All)

[56] References Cited
UNITED STATES PATENTS

| | | | |
|---|---|---|---|
| 3,071,010 | 1/1963 | Lupkas | 235/61.11 |
| 3,352,981 | 11/1967 | Ekers | 235/61.11 |
| 3,433,932 | 3/1969 | Rolke | 235/61.11 |

*Primary Examiner*—Thomas A. Robinson
*Attorneys*—Curtis, Morris, and Safford, Marshall M. Holcombe, William Hintze, William J. Keating, Frederick W. Raring, John R. Hopkins, Adrian J. La Rue and Jay L. Seitchik

ABSTRACT: A reliable, low cost card reader for reading credit cards. A simplified mechanism for actuating the card reading head comprises a spring toggle arrangement which is released when a credit card is inserted into the reader. A manual lever resets the toggle arrangement to raise the reading head and eject the card. The mechanism utilizes a number of inexpensive stamped parts, and the design is such that assembly of parts is very easy and precise.

Figures 1, 2:
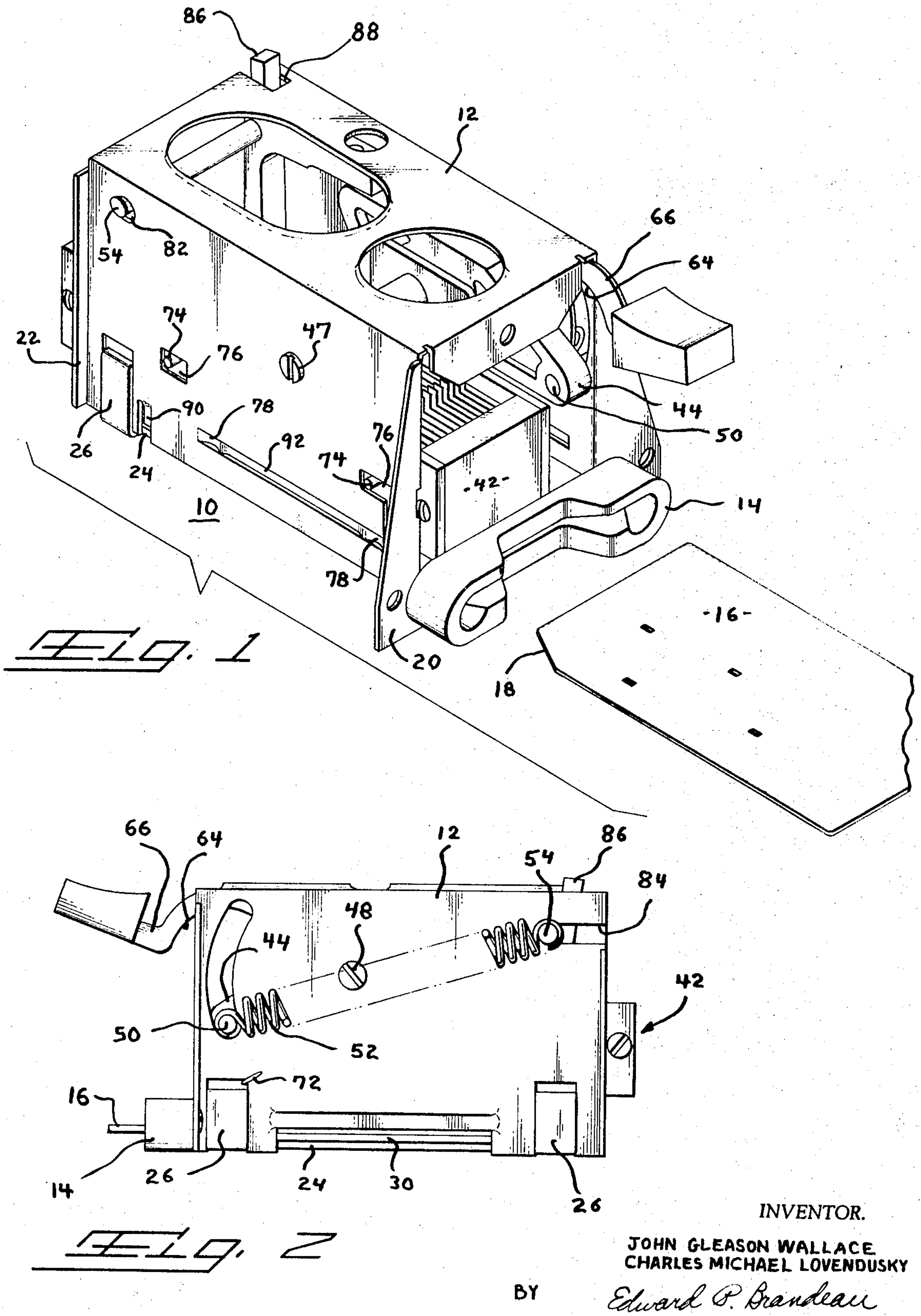

INVENTOR.

JOHN GLEASON WALLACE
CHARLES MICHAEL LOVENDUSKY

BY Edward P. Brandeau

INVENTOR.

JOHN GLEASON WALLACE
CHARLES MICHAEL LOVENDUSKY

BY Edward P. Brandeau

Patented April 6, 1971 3,573,434

3 Sheets-Sheet 3

INVENTOR.

JOHN GLEASON WALLACE
CHARLES MICHAEL LOVENDUSKY

BY Edward P. Brandeau

CARD READER

This invention relates to a cardreader especially suited for reading credit cards and similar documents coded with spaced holes.

An object of this invention is to provide a highly reliable yet much less expensive cardreader than ones previously available.

A further object is to provide such a reader which is small in size and which is rugged and easy to use in operation.

Still another object is to provide a cardreader of this kind which has a high degree of precision yet is simple to manufacture and assemble.

These and other objects will in part be understood from and in part pointed out in the following description.

In a cardreader to which the invention relates, a plurality of sensing springs are held in a matrix or head. The springs and head are moved as a unit toward or away from a platen on which can be placed a card, such as a credit card, to be read. The sensing springs are precisely mounted on closely spaced centers which correspond to the positions where holes in the card may occur. Wherever there is a hole, the corresponding spring extends through and makes electrical contact with a conducting pad or strip on the platen.

Now in order that a card be accurately read each time one is inserted in the reader, the spring head must be precisely controlled in its movement toward the platen. Desirably, the precision of this movement should be maintained over hundreds of thousands of cycles of operation. Thus the mechanism which moves the head, and the frame which holds this mechanism, must be rugged and substantially free of wear and the incidents of hard use.

From the standpoint of the user, it is desirable that the card reader be simple and positive to actuate and not dependent in its accuracy on how carefully or not the card is inserted into it. The present invention achieves these and the above objectives with parts of novel design which are nonetheless very inexpensive to fabricate and to assemble.

In accordance with the invention in one specific embodiment thereof, the mechanism for moving the head toward and away from the platen includes a very powerful tension spring, one end of which is fixed and the other end of which is connected to a lever arm of an eccentric shaft. The head is journaled on this shaft, and moves up or down when the shaft is rotated. The downward limit of travel of the head is determined by the upward limit of travel of the shaft lever arm. The upward limit of the head is determined by the downward limit of travel of the lever arm. In the up position of the head, the shaft lever arm and the tension spring are in slightly overcenter toggle condition.

Moving the head down to read a credit card is accomplished by inserting the card into the reader. The rear end of the card pushes against a lower end of a second lever arm which in turn "breaks" the toggle of the shaft arm and spring, and enables the latter to drive the head down to its bottom limit. After the card is read, it is released by means of a hand lever which is manually depressed thereby rotating the eccentric shaft and its lever to raise the head. Simultaneously, at the last portion of upward travel, the shaft lever arm moves against the stop screw on the second lever arm, and the latter flicks the card partly out of the reader.

Figure 3:
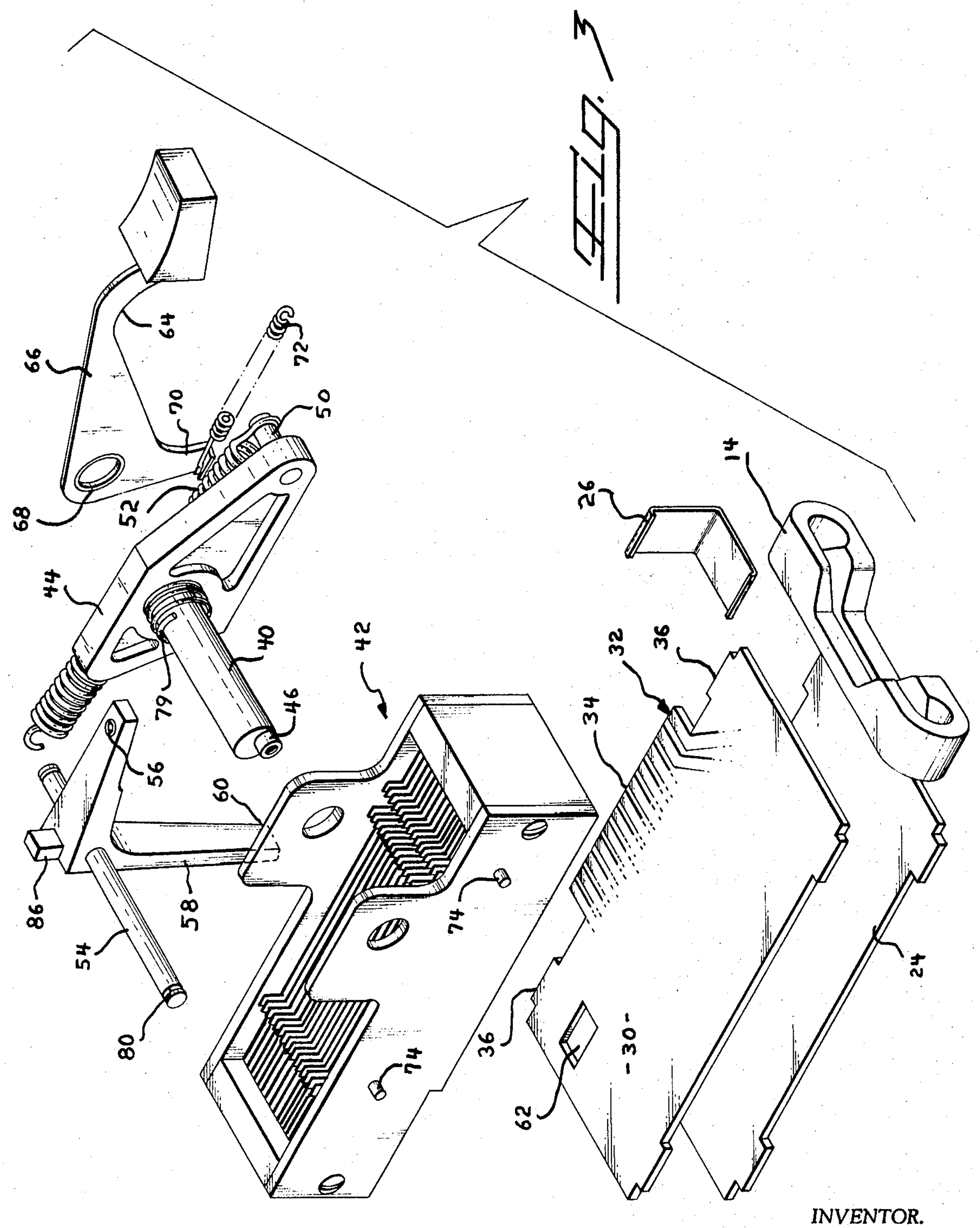
Figure 4:
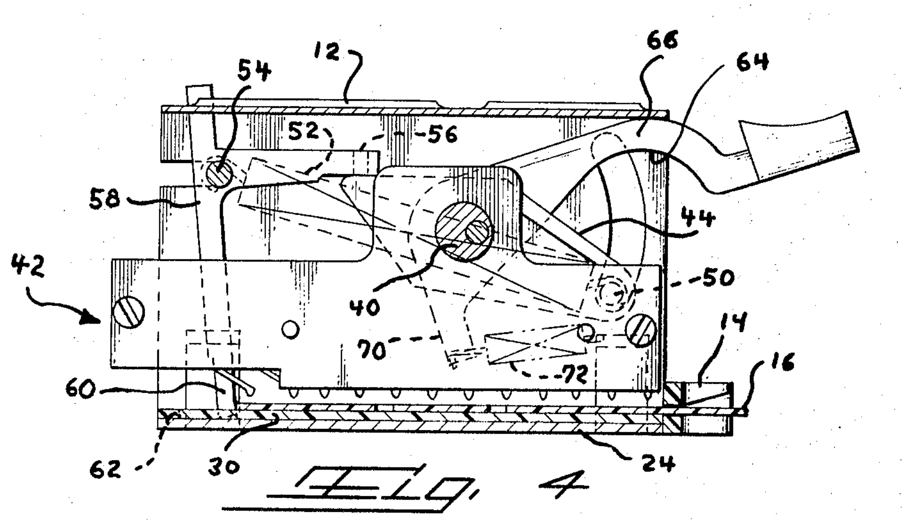
Figure 5:
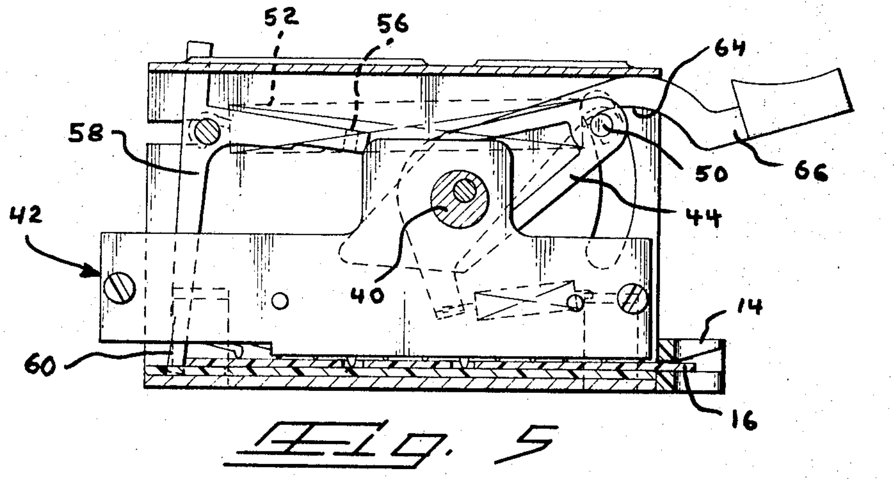
Figure 6:
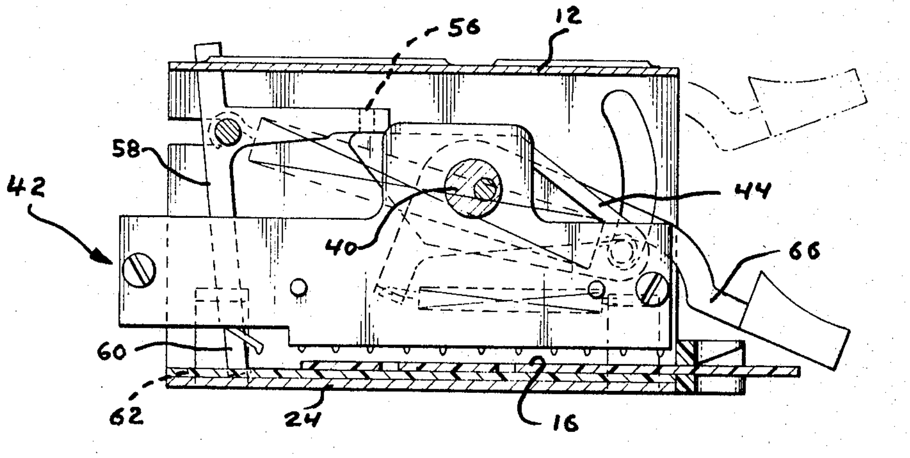

A better understanding of the invention together with a fuller appreciation of its many advantages will best be gained from the following description given in connection with the accompanying drawings, wherein:

FIG. 1 is a perspective view of a cardreader embodying features of the invention, FIG. 2 is a right side view of the cardreader, FIG. 3 is an exploded view of the cardreader, the frame and housing not being shown, FIG. 4 is a left side section view of the reader showing a credit card partly inserted and the sensing head in up position, FIG. 5 is a view similar to FIG. 4 but showing the card fully inserted and the head in down position, and FIG. 6 is a view similar to FIGS. 4 and 5 but showing how, through depressing the hand lever, the sensing head is raised and the card ejected from the reader.

The cardreader 10 shown in FIG. 1 includes a sheet metal housing 12 which contains a cardreading and sensing mechanism. Positioned at the lower front of the housing is a card-receiving mouth 14 into which a card, such as credit card 16, can be inserted. The left, front corner of the card is cut off along slant line 18 to give a physical orientation of the card. It can only be fully inserted into the reader in the orientation shown here.

Housing 12, which is a U-shaped stamping, has front mounting flanges 20 and rear flanges 22 which provide additional rigidity along the top and sides of the housing. The bottom of the housing comprises a flat plate 24 (see also FIG. 3) which is held tightly in place by four spring clips 26, one at each corner of the plate. The plate in turn supports a platen 30 in the form of a printed circuit board having conductive areas 32 on it. These areas are connected to external circuitry via an edge contact strip 34. Platen 30, by its corners 36, is precisely positioned within housing 12 and is clamped tight by plate 24 and clips 26.

As seen in FIGS. 4—6, mounted transversely near the center of housing 12 is an eccentric shaft 40. Journaled on this shaft is a sensing head, generally indicated at 42. The latter can be substantially identical to the one described in copending U.S. Pat. by Cornelius W. Bosland, Ser. No. 746,783 filed Jul. 23, 1968 for "Sensing Spring Arrangement for Cardreader," and will not be described in greater detail herein.

As best in FIG. 3, shaft 40 has keyed onto its right end a diamond-shaped lever arm 44. Shaft 40 has extending through it on a center line displaced from its own center an axle 46. The left end of this axle (see FIG. 1) is fastened inside housing 12 by a flathead screw 47, and the right end (see FIG. 2) by a similar screw 48. When arm 44 is rotated, shaft 40 rotates on axle 46 and raises or lowers head 42, as explained above.

The forward end of arm 44 carries a pin 50, which as seen in FIG. 2 extends through a slot in the housing 12. The outer end of pin 50 carries one end of a main tension spring 52. The rear end of this spring is anchored on the outer end of a stationary shaft 54. In the position of arm 44 and spring 52 shown in FIG. 4, these parts are in overcentered toggle condition, with spring 52 urging the arm and its shaft 40 clockwise. This holds head 42 in raised position.

As seen in FIG. 4, the rear end of lever arm 44 is adapted to be engaged by a setscrew 56 carried in the upper end of an L-shaped arm 58. Arm 58 (see also FIG. 3) is pivoted on shaft 54. The arm has a lower end 60 which projects into a cutout 62 in platen 30. Now, as seen in FIG. 5, when a card 16 is inserted all the way into the reader, the rear edge of the card pushes against arm end 60 and moves arm 58 clockwise. This in turn rotates lever arm 44 sufficiently counterclockwise to break the toggle and permit main spring 52 to snap arm 44 (and head 42) to the position shown in FIG. 5. In this position head 42 "reads" the coded holes in the card 16.

The counterclockwise limit of lever arm 44 shown in FIG. 5 is determined by the abutment of its pin 50 with an edge 64 of a manual lever 66. The latter, in the position shown, bears against an upper front edge of housing 12. As seen in FIG. 3, the rear end of manual lever 66 carries a bushing 68 which fits over the right end of shaft 40. Lever 66 is freely pivoted on the shaft and is properly spaced between lever 44 and the side of the housing by the bushing 68. Projecting down from the rear end of manual lever 66 is a tab 70 to which is attached one end of a light tension spring 72. The forward end of this spring, as seen near the right in FIG. 4, is hooked over an edge of a cutout in the right front side of the housing. Spring 72 urges manual lever 66 to the position shown in FIGS. 1, 2, and 4.

After a card has been read, it is ejected from the reader by depressing manual lever 66, as indicated by the solid line position in FIG. 6. When this lever moves down from the dotted line position shown, it carries with it pin 50 and lever 44. Near the bottom of its stroke, pin 50 passes over the toggle center of main spring 52. This causes the spring to "snap" lever 44 the rest of the way down. Head 42 has now been lifted clear of card 16, and when lever 44 snaps down, its rear pushes against screw 56 thereby rotating L-shaped arm 58 counterclockwise to the position shown in FIG. 6, and flicking card 16 part way of the reader.

As seen in FIG. 3, sensing head 42 has projecting from its left side a pair of pins 74 which, as seen in FIG. 1, project through respective cutouts 76 in the side of housing 12. Pins 74, when head 42 is up, are against the upper edges of cutouts 76 and hold the head parallel to platen 30, and when the head is down these pins are against the lower edges of cutouts 76 and likewise insure that the head is parallel. The left side of housing 12 is dimpled at points 78, head 42 being laterally aligned against the inner faces of these dimples. As seen in FIG. 3, shaft 40 next to lever arm 44 carries a limber compression spring 79. The latter urges head 42 leftward against dimples 78.

The parts of the cardreader have been designed for great ease and precision in assembly. Shaft 40, head 42, arm 44, arm 66, and spring 79 as a subassembly are slipped inside housing 12, and then axle 46 is inserted from outside and fastened by screws 47 and 48. As seen in FIG. 3, the left end of shaft 54 has a groove 80 in it. Shaft 54 with arm 58 as a subassembly is inserted in the housing with groove 80 fitting into and retained by an egg-shaped cutout 82 (See FIG. 1) in the left side of the housing. The right end of shaft 54 (see FIG. 2) extends through a slot 84 in the housing. Main spring 52 which is anchored on the end of shaft 54, holds it in place. Arm 58 is laterally aligned on shaft 54 by means of an upstanding ear 86 (see FIG. 1) which extends through a slot 88 in the top of the housing.

As seen near the lower side rear in FIG. 1, housing 12 is pierced and formed in as a tab 90. The cut corner 18 of card 16 just misses this tab when the card is fully inserted, whereas an uncut corner of the card if it is inserted improperly into the reader, will come against tab 90 and prevent the card from actuating the sensing head. The lower side of the housing is dimpled inward to form a longitudinal rib 92. This rib and a similar rib on the other side of the housing serve as top edge guides for card 16 when it is inserted into the housing.

The drawings of cardreader 10 were made from an actual unit which has been built and successfully operated. The drawings shown the parts of this unit substantially to scale. Lever arm 44 is made of aluminum and is rigidly keyed onto shaft 40 in the proper angular orientation. Manual lever 66 is made of a heat-treated steel stamping. L-shaped arm 58 is molded of plastic such as Delrin.

The above description is intended in illustration and not in limitation of the invention. Various changes or modifications in the embodiment described may occur to those skilled in the art and may be made without departing from the spirit or scope of the invention as set forth.

We claim:

1. In a cardreader of the character described, an improved actuating mechanism comprising a card-receiving platen, a head, an eccentric shaft on which said head is pivotally mounted an by which it is moved toward and away from said platen, a frame for supporting said shaft and said platen in generally parallel spaced relation, a rigid lever arm fixed on said shaft, a main spring connected between a point on said lever arm and a point on said frame, upper and lower stop means to limit the upper and lower rotation of said lever arm, said lever arm and said spring comprising a toggle arrangement, said lever arm in its lower position being slightly over toggle center and being urged against said lower stop means by said spring, and said lever arm in its upper position being substantially beyond toggle center and being urged against said upper stop means by said spring, arm means actuated by the insertion of a card into the reader to move said lever arm up beyond toggle center, and actuating means to move said lever arm from its upper to its lower position.

2. The mechanism in claim 1 wherein said frame comprises a sheet metal housing formed into U-shape, said shaft being mounted transversely near the center of said housing, said platen being mounted across the bottom of said housing, and said arm means comprises an L-shaped arm pivoted near the upper rear of said housing, the lower end of said L-shaped arm being engageable with the front edge of a card as it is inserted into said mechanism.

3. A simplified cardreader of the character described comprising: a U-shaped thin wall housing having an open bottom, a card-receiving platen tightly fitted across the open bottom of said housing, an eccentric shaft mounted transversely within said housing near the center thereof, a spring toggle mechanism coupled to said shaft to rotate it clockwise and counterclockwise and to hold it in either position, a cardreading head mounted on said shaft for movement toward and away from said platen, trigger means engageable by the front edge of a card when it is inserted into said reader to move said toggle mechanism back over center and to allow it to rotate said shaft counterclockwise and to move said head into cardreading position, and manually operable means to move said toggle to overcenter condition to rotate said shaft clockwise and to raise said head from cardreading position.

4. The reader in claim 3 wherein said toggle mechanism comprises a lever arm on the end of said eccentric shaft, a main spring acting between a point on said lever arm and a fixed point on said housing, the line of centers of said points being positioned relative to the axis of said shaft to form a self-locking slightly overcenter toggle when said shaft is in its upper position.

5. The reader in claim 4 wherein said fixed point on said housing comprises the outer end of a fixed shaft mounted transversely across the upper rear of said housing, said trigger means comprising an L-Shaped arm pivoted on said fixed shaft, the lower end of said L-shaped arm being engageable by the front edge of a card, the upper end of said L-Shaped arm being engageable with said lever arm.

6. The reader in claim 5 wherein said fixed shaft is retained in place by groove engagement with said housing and by force from said main spring.

7. The reader in claim 3 wherein said eccentric shaft comprises a rotatable shaft mounted offcenter on an axle, said axle being slidable through said shaft for assembly and being retained at each end by a head screw engaging a respective sidewall of said housing.